(12) United States Patent  
Chang et al.

(10) Patent No.: US 7,961,284 B2
(45) Date of Patent: Jun. 14, 2011

(54) LIQUID CRYSTAL DISPLAY AND METHOD FOR MANUFACTURING THE SAME

(75) Inventors: Youn Gyoung Chang, Anyang-si (KR); Heung Lyul Cho, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 685 days.

(21) Appl. No.: 11/474,955

(22) Filed: Jun. 27, 2006

(65) Prior Publication Data
US 2007/0070280 A1 Mar. 29, 2007

(30) Foreign Application Priority Data
Jun. 30, 2005 (KR) .................. 10-2005-0058870

(51) Int. Cl.
*G02F 1/1343* (2006.01)
(52) U.S. Cl. .................. 349/141; 349/139; 349/143
(58) Field of Classification Search .................. None
See application file for complete search history.

(56) References Cited

U.S. PATENT DOCUMENTS

| | | | | |
|---|---|---|---|---|
| 6,292,237 | B1* | 9/2001 | Hebiguchi | 349/39 |
| 6,795,133 | B2* | 9/2004 | Deane | 349/39 |
| 2001/0019388 | A1* | 9/2001 | Kim et al. | 349/129 |
| 2002/0021396 | A1* | 2/2002 | Yoo et al. | 349/141 |
| 2002/0159016 | A1* | 10/2002 | Nishida et al. | 349/141 |
| 2003/0133053 | A1* | 7/2003 | Ono et al. | 349/38 |
| 2005/0206824 | A1* | 9/2005 | Son et al. | 349/141 |
| 2007/0153201 | A1* | 7/2007 | Lee et al. | 349/141 |

* cited by examiner

*Primary Examiner* — Uyen-Chau N Le
*Assistant Examiner* — Chad H Smith
(74) *Attorney, Agent, or Firm* — Morgan, Lewis & Bockius LLP

(57) ABSTRACT

A method of manufacturing a liquid crystal display, the method including the steps of preparing a substrate, forming a first pattern on a first print roll, forming a first print pattern using the first print roll applied in a first direction, forming a second pattern on a second print roll, and forming a second print pattern using the second print roll applied in a second direction.

5 Claims, 8 Drawing Sheets

(Related Art)

LIQUID CRYSTAL DISPLAY AND METHOD FOR MANUFACTURING THE SAME

The present invention claims the benefit of Korean Patent Application No. 10-2005-0058870 filed in Korea on Jun. 30, 2005, which is hereby incorporated by reference.

BACKGROUND OF THE INVENTION

1. Field of the Invention

The present invention relates to a liquid crystal display and a method for manufacturing the same, and more particularly, to a liquid crystal display and a method for manufacturing the same that reduces the use of photolithography processes.

2. Discussion of the Related Art

In general, a liquid crystal display refers to a display device in which liquid crystal material with an anisotropic dielectric constant is injected between an upper transparent insulating substrate, typically used as a color filter substrate, and a lower transparent insulating substrate, typically used as an array substrate. An electric field applied to the liquid crystal material is adjusted in intensity such that the molecular arrangement of the liquid crystal material changes accordingly. Thus, the amount of light transmitted to the transparent insulating substrate through the liquid crystal material is controlled and a desired image is displayed. A common type of a liquid crystal display is a thin film transistor liquid crystal display (TFT LCD) using a TFT as a switching device.

In such a liquid crystal display, a mask process is commonly used to manufacture the print pattern of a thin film transistor, a color filter, and a black matrix. The mask process is accompanied by other processes such as rinsing, deposition, baking, irradiating, developing, etching, and peeling-off procedures. In the mask process, a large number of photoresists are required. Thus, manufacturing cost and process time are increased.

FIG. 1 illustrates a resist printing method according to the related art. As shown in FIG. 1, a template 11 with a transfer pattern (P1) first causes a pattern to be formed on print roll 10. Print roll 10 may have a silicon rubber surface. The print pattern (P2) is then transferred to the transparent insulating substrate 100. Thus, the print pattern (P2) is not directly transferred from the template 11 to the transparent insulating substrate 100 in the resist printing method.

FIG. 2 and FIG. 3 illustrate part of the print pattern of a related art liquid crystal display. FIG. 2 illustrates a gate line 110, a gate electrode 111, and an outer common line 120. The gate electrode 111 is connected to the gate line 110. The outer common line 120 is disposed along a region having an individual pixel formed therein. FIG. 3 illustrates a shape of a data line 130.

As shown in FIG. 2 and FIG. 3, the print pattern of the related art liquid crystal display is generally constructed to have a complex shape. Typically, the shape is angular rather than a simple straight-line shape. As a result, the print pattern of the related art liquid crystal display cannot be formed using a resist printing process. Rather, the patterns must be formed using a photolithography process, which increases the manufacturing cost and process time as a large number of photoresist steps are required.

To overcome drawbacks posed by the complex shape of the print pattern of the related art liquid crystal display, a straight-line shaped print pattern has been introduced to simplify the photolithography process. To the extent possible, the photolithography process is replaced by a resist printing process. In this approach, however, part of the print pattern is shifted when the straight-line shaped print pattern is formed using resist printing.

FIG. 4 illustrates a drawback of resist printing by comparing a pattern created by a mask pattern (P3) and a pattern created by resist printing, i.e., print pattern (P2). In general, a main drawback of resist printing is a stretched pattern resulting from a pushing motion of the print roll 10 as it moves across the substrate 100 to transfer the print pattern (P2). As shown in FIG. 4, horizontal shapes formed by the resist printing process, i.e., horizontal print patterns (P2), are stretched compared to horizontal shapes formed by a mask, i.e., horizontal mask patterns (P3). Further, positions of the vertical shapes formed by the resist printing process, i.e., vertical print patterns (P2), are shifted in the printing direction compared to the position of the vertical shapes formed by the mask, i.e., vertical mask patterns (P3). Accordingly, compared to the mask patterns (P3) formed by a mask process, the print patterns (P2) formed by the resist printing process are elongated and shifted from the desired position of the patterns.

The shifted and stretched portions of print pattern (P2) affect the performance of the liquid crystal display. For example, the shifted portions of print pattern (P2) cause a reduction in the aperture ratio and inaccurate alignment that results in light leakage.

SUMMARY OF THE INVENTION

Accordingly, the present invention is directed to a liquid crystal display and a method for manufacturing the same that substantially obviates one or more of the problems due to limitations and disadvantages of the related art.

An object of the present invention is to provide a liquid crystal display device.

Another object of the present invention is to provide a method for efficiently manufacturing a liquid crystal display.

Another object of the present invention is to provide a method for manufacturing a liquid crystal display that prevents a shift of the print pattern in the resist printing process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display and method for manufacturing the same includes a method of manufacturing a liquid crystal display, the method including the steps of preparing a substrate, forming a first pattern on a first print roll, forming a first print pattern using the first print roll applied in a first direction, forming a second pattern on a second print roll, and forming a second print pattern using the second print roll applied in a second direction.

In another aspect, a liquid crystal display includes a substrate, a gate line, a data line, a thin film transistor on the substrate, the thin film transistor including a gate electrode, a semiconductor layer, a source electrode, and a drain electrode, a gate insulating layer disposed between the gate electrode and the semiconductor layer, a passivation layer on the substrate and the thin film transistor, a pixel electrode connected with the drain electrode through a contact hole in the passivation layer, and an outer common line surrounding a pixel.

In another aspect, a method of manufacturing a liquid crystal display, the method including the steps of preparing a substrate, forming a first pattern on a first print roll, forming a first print pattern using the first print roll applied in a first direction, forming a second pattern on a second print roll, and forming a second print pattern using the second print roll applied in a second direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
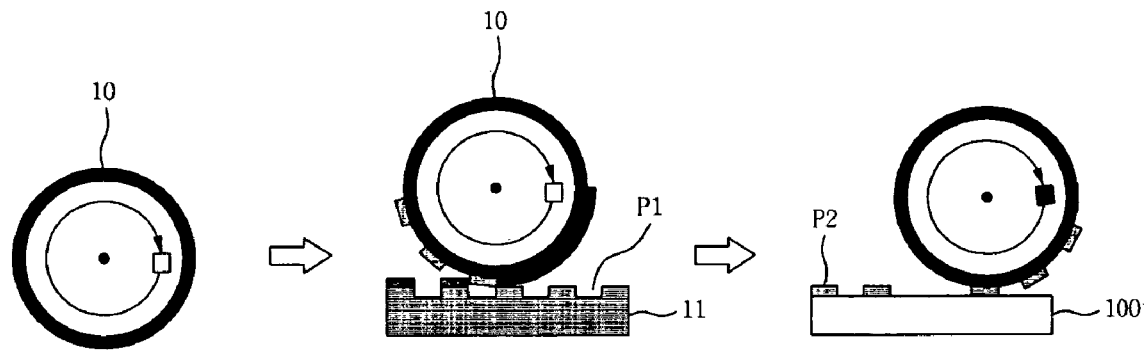
FIG. 1 illustrates a resist printing process of the related art.
Figure 2:
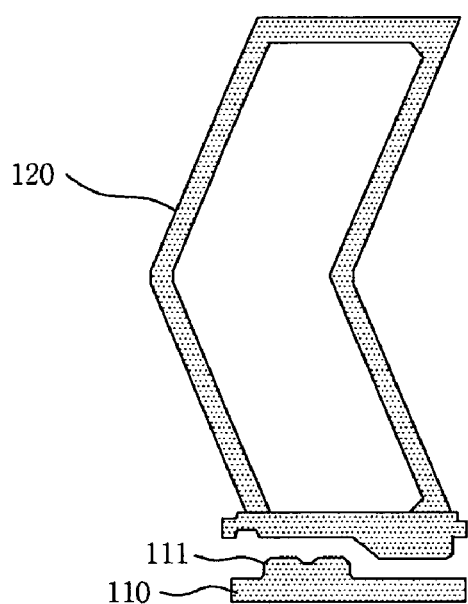
FIG. 2 and 3 illustrate a part of a print pattern of a related art liquid crystal display.
Figure 3:
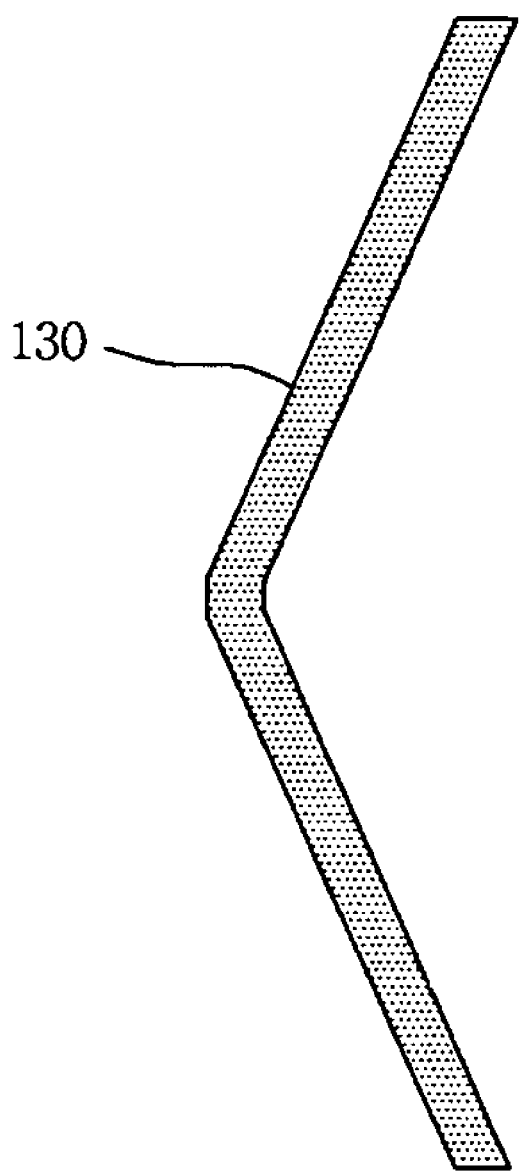
Figure 4:
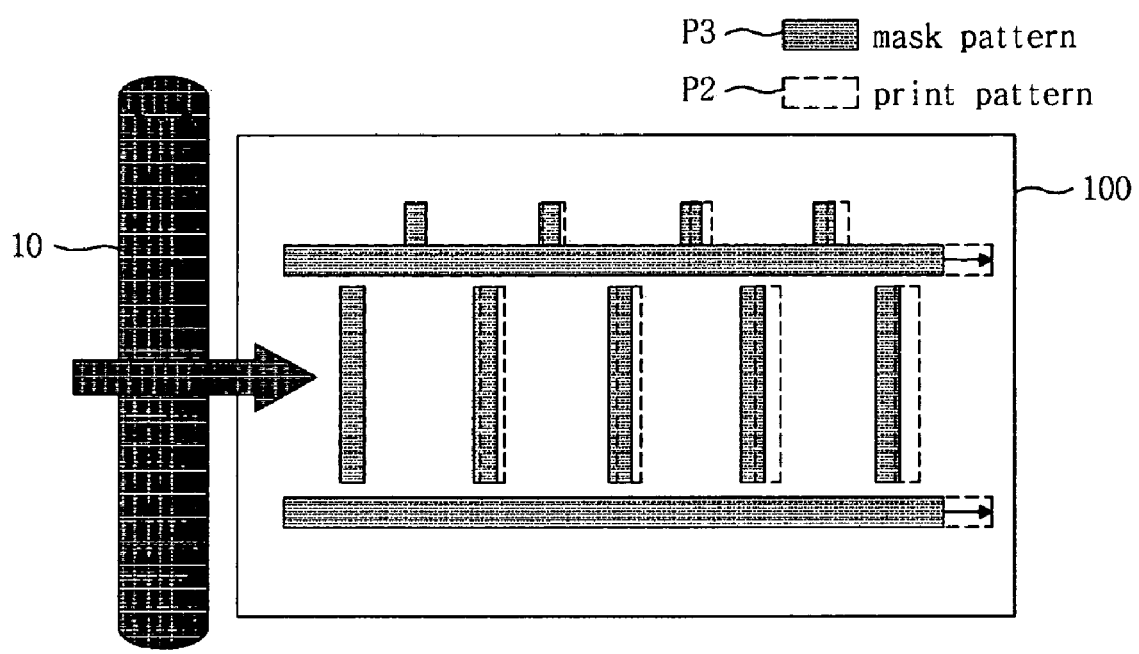
FIG. 4 illustrates a drawback of the related art resist printing process.
Figure 5:
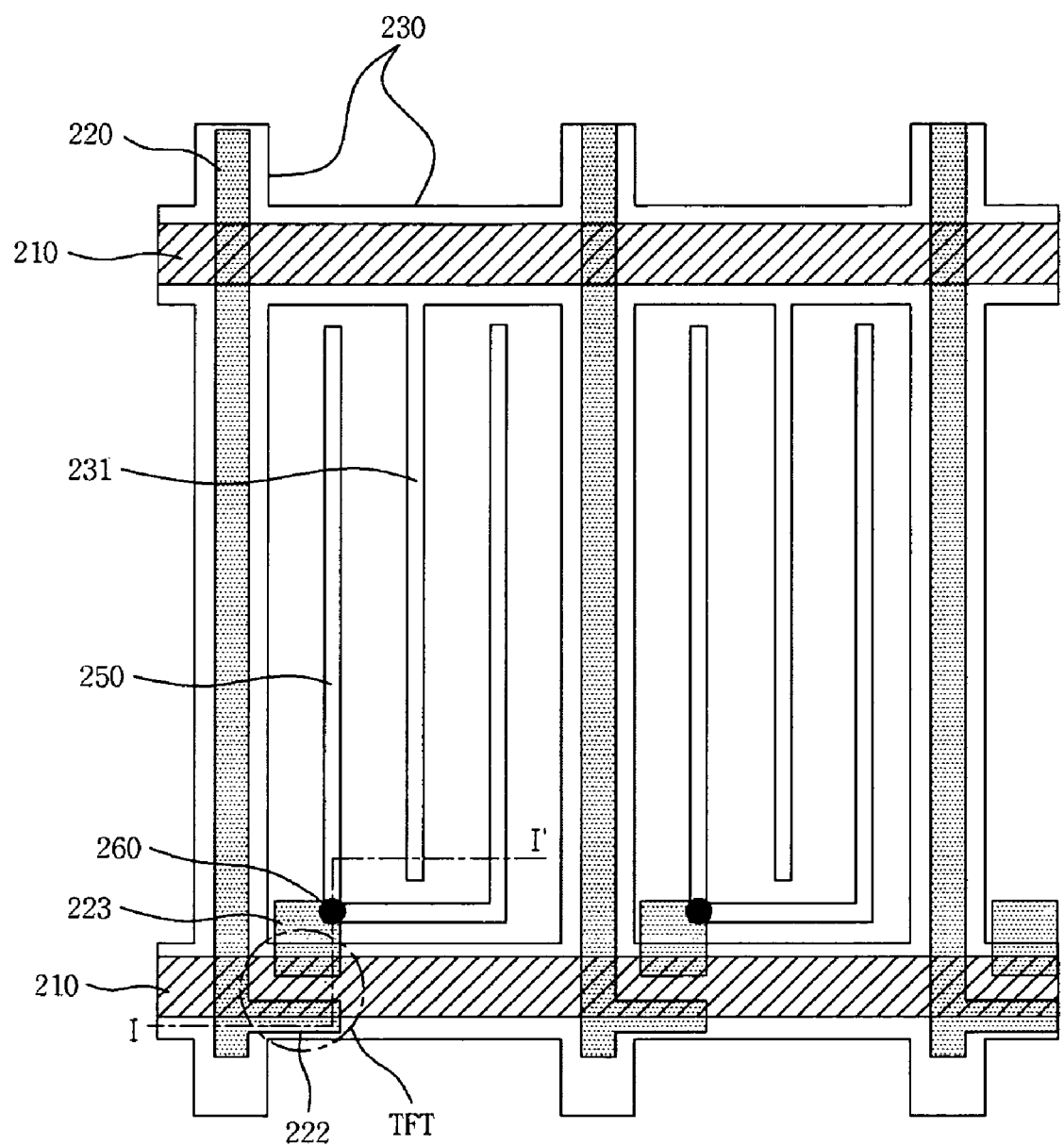
FIG. 5 is illustrates a liquid crystal display according to an exemplary embodiment of the present invention.
Figure 6:
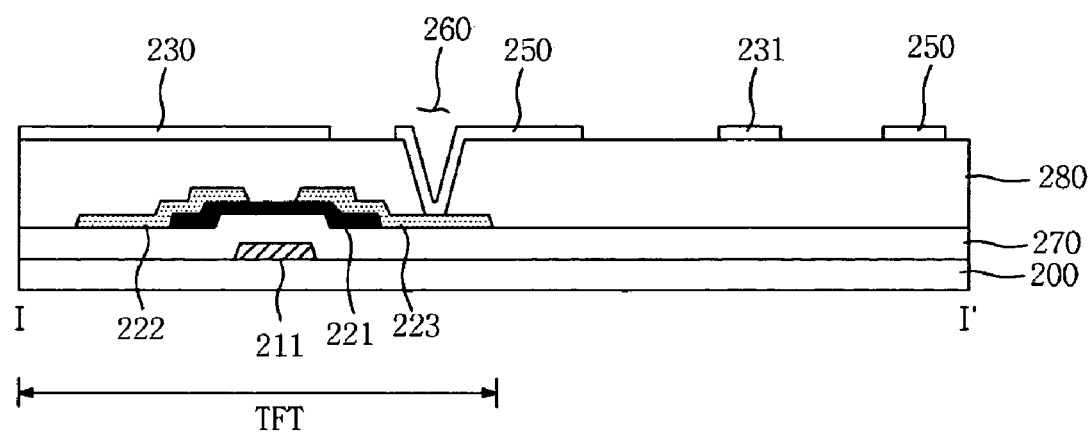
FIG. 6 is a cross-sectional view taken along the I-I' line of FIG. 5.

FIG. 5 illustrates a liquid crystal display according to an exemplary embodiment of the present invention. FIG. 6 is a cross-sectional view taken along the I-I' line of FIG. 5.

Referring to FIG. 5 and FIG. 6, the liquid crystal display according to an exemplary embodiment of the present invention includes a transparent insulating substrate 200, a gate line 210, a data line 220, a gate insulating layer 270, a thin film transistor (TFT), and a passivation layer 280. The gate insulating layer 270 is formed on the transparent insulating substrate 200. The passivation layer 280 is formed on the transparent insulating substrate 200 and the gate insulating layer 270. The gate line 210 and the data line 220 are formed on the transparent insulating layer 200 in horizontal and vertical directions, respectively, to meet at right angles.

The thin film transistor (TFT) includes a gate electrode 211 on the transparent insulating substrate 200, a semiconductor layer 221 formed over the gate electrode 211 with the gate insulating layer 270 interposed therebetween, a source electrode 222, and a drain electrode 223. The source electrode 222 and the drain electrode 223 are spaced apart and formed at opposing sides of the semiconductor layer 221. A contact hole 260 is formed in the passivation layer 280 to facilitate connection to the drain electrode 223. The gate electrode 211 is formed to connect to the gate line 210.

An outer common line 230 is disposed on the passivation layer 280 in the horizontal and vertical directions. The outer common line 230 is formed such that a horizontal straight-line component intersects with a vertical straight-line component. Common electrodes 231 are connected to the outer common line 230, and are disposed in a vertical direction such that they are parallel to pixel electrodes 250.

The pixel electrode 250, which is connected to the drain electrode 223 through contact hole 260, is formed in the vertical direction to alternate with the common electrode 231. The pixel electrode 250 may be provided in a region formed by the intersection of gate line 210 and data line 220.

The outer common line 230, common electrode 231, and pixel electrode 250 may be formed on the passivation layer 280. The outer common line 230, common electrode 231, and pixel electrode 250 are formed of a transparent conductive material. For example, indium tin oxide (ITO) or indium zinc oxide (IZO) may be used. The passivation layer 280 is formed of organic insulating material with low dielectric constant, thereby reducing parasitic capacitance between outer common electrode 230 and the data line 220.

Figure 7:
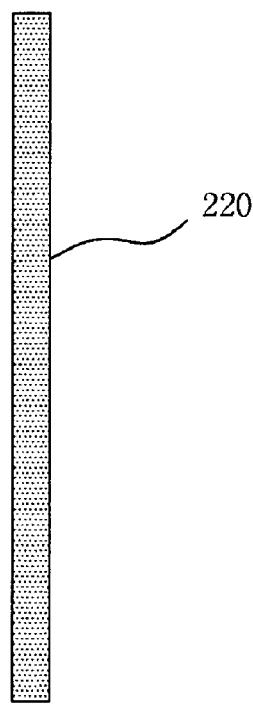
FIG. 7 illustrates a part of an exemplary print pattern of the liquid crystal display of FIG. 5.

FIG. 7 illustrates a part of an exemplary print pattern of the liquid crystal display of FIG. 5. The data line 220 is straight-line shaped in the vertical direction. Like the data line 220, the outer common line 230, common electrode 231, pixel electrode 250, source electrode 222, and drain electrode 223 may be formed by a straight-line shaped print pattern in the horizontal direction, vertical direction, or a combination of two straight-line shapes.

Accordingly, formation of angular print patterns is minimized. The data line 220, pixel electrode 250, and common electrode 231 are formed to have a straight-line shaped print pattern that is parallel to the print direction. As a result, a photolithography process may be replaced by a resist printing process while minimizing the shifting phenomenon of the print pattern.

The print pattern is based on a combination of a straight-line shape in the horizontal direction and a straight-line shape in the vertical direction. Accordingly, the resist printing process is performed once in the horizontal direction as the print direction, and once more in the vertical direction as the print direction.

Figure 8:
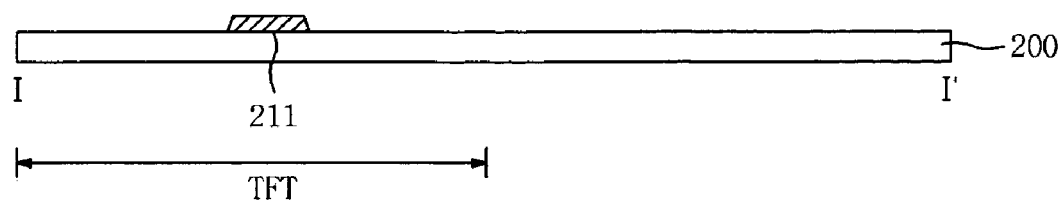
FIGS. 8 to 13 are cross-sectional views illustrating various stages of a method for manufacturing a liquid crystal display according to an exemplary embodiment of the present invention.
Figure 9:
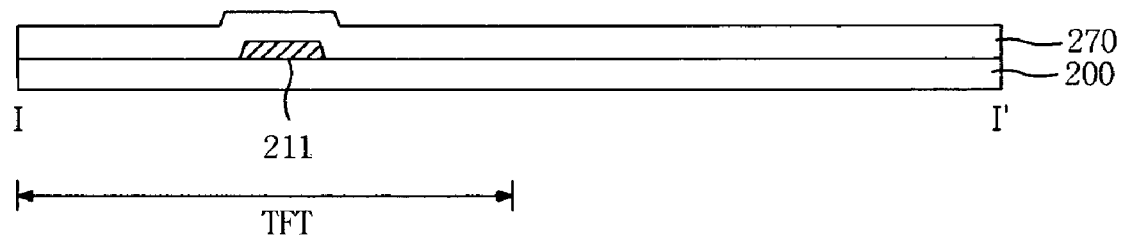
Figure 10:
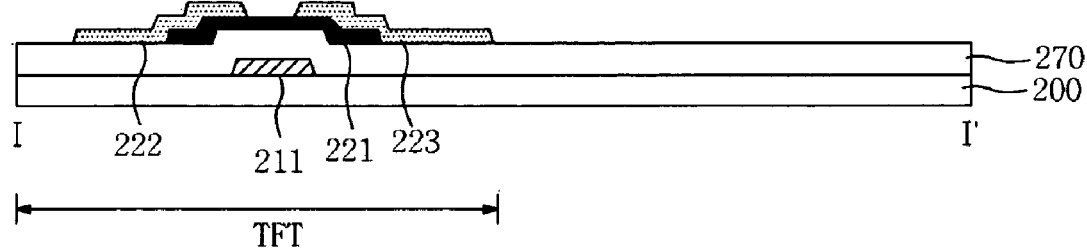
Figure 11:
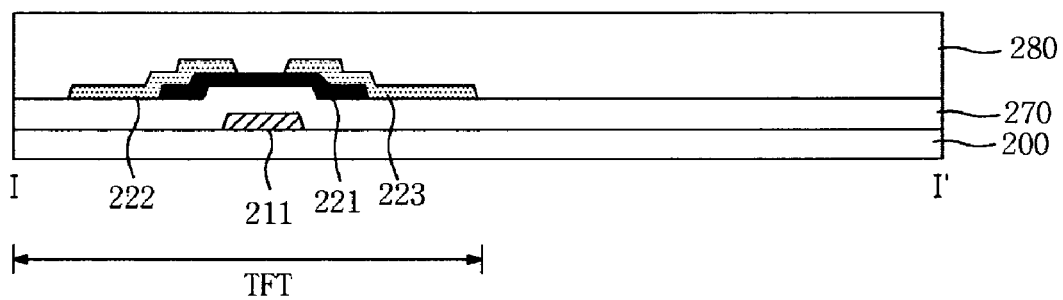
Figure 12:
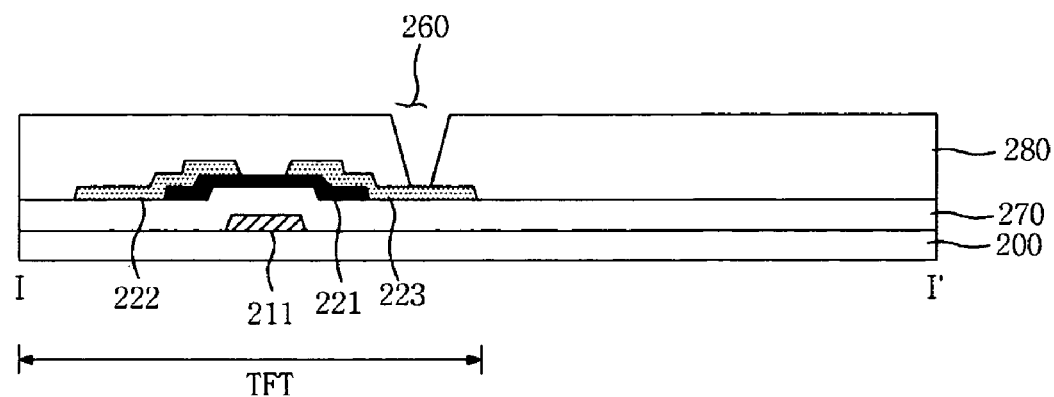
Figure 13:
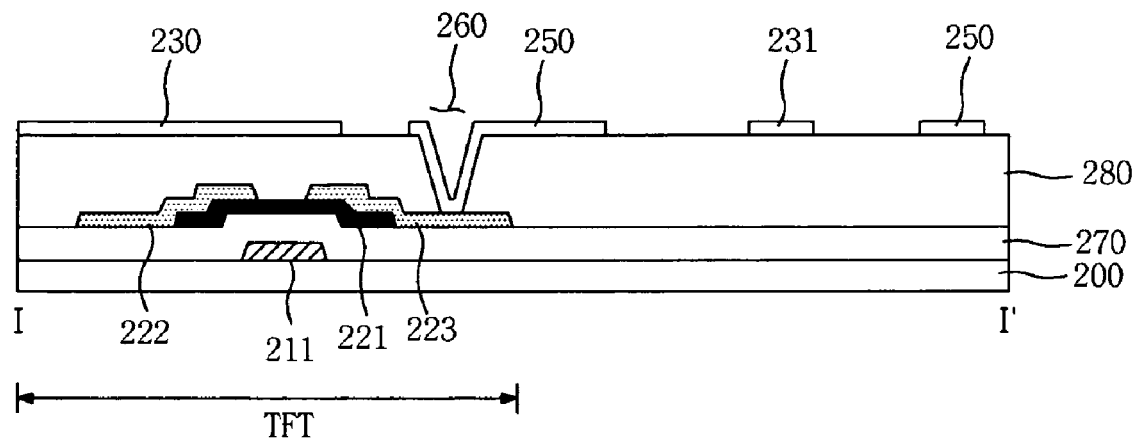

FIGS. 8 to 13 are cross-sectional views illustrating various stages of a method for manufacturing the liquid crystal display according to an exemplary embodiment of the present invention. First, as shown in FIG. 8, the gate electrode 211 is formed on the transparent insulating substrate 200. Next, as shown in FIG. 9, the gate insulating layer 270 is formed on the transparent insulating substrate 200 and the gate electrode 211. Subsequently, as shown in FIG. 10, the semiconductor layer 221 is formed in a region of the gate insulating layer 270 associated with the gate electrode 211. The source electrode 222 and the drain electrode 223 are spaced apart and formed at opposing sides of the semiconductor layer 221 to form the thin film transistor (TFT). Next, as shown in FIG. 11, the passivation layer 280 is formed on the gate insulating layer 270, semiconductor layer 221, source electrode 222, and drain electrode 223. Then, as shown in FIG. 12, the contact hole 260 is formed in the passivation layer 280 to expose the drain electrode 223. Next, as shown in FIG. 13, the pixel electrode 250 and the common electrode 231 are formed on the passivation layer 280. The pixel electrode 250 and the common electrode 231 are disposed in parallel to alternate with each other.

The common electrode 231 may be constructed such that it is connected to the outer common electrode 230. The outer common electrode 230 is formed along the gate line 210 and the data line 220 to surround a pixel (FIG. 5). The outer common electrode 230 may be formed on the passivation layer 280, such that it is coplaner with the pixel electrode 250 and the common electrode 231. The passivation layer 280 may be formed from an organic insulating material with the low dielectric constant, thereby minimizing the parasitic capacitance caused by an overlap of the outer common electrode 230 and the data line 220.

The gate line 210 is straight-line shaped print pattern in the horizontal direction and is connected to the gate electrode 211. The gate line 210 may be formed by the resist printing process such that its horizontal direction is co-directional with the print direction along which a print roll (not shown) moves during the resist printing process. The outer common line 230, common electrode 231, pixel electrode 250, source electrode 222, and drain electrode 223 may also have a straight-line shaped print pattern in the horizontal direction, vertical direction, or a combination of two straight-line shapes. The straight-line shaped print pattern in the horizontal direction or the vertical direction can be formed using the resist printing process according to the method of the present invention. Specifically, the horizontal direction or the vertical direction of the print pattern is in the same the print direction along which the print roll moves in the resist printing process.

In accordance with the present invention, the mask process or photolithography process is replaced by the resist printing process to the extent possible. As a result, the aperture ratio and alignment of the conventional liquid crystal displays are improved. Particularly, the reduction in the aperture ratio and the inaccurate alignment that results in light leakage are overcome, and the performance of the liquid crystal display is improved.

It will be apparent to those skilled in the art that various modifications and variations can be made in the liquid crystal display and a method for manufacturing the same of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a substrate;
   a gate line;
   a data line;
   a thin film transistor on the substrate, the thin film transistor including a gate electrode, a semiconductor layer, a source electrode, and a drain electrode;
   a gate insulating layer disposed between the gate electrode and the semiconductor layer;
   a passivation layer on the substrate and the thin film transistor;
   a pixel electrode connected with the drain electrode through a contact hole in the passivation layer;
   an outer common line surrounding a pixel and formed on the passivation layer; and
   a common electrode connected to the outer common line,
   wherein the outer common line is overlapped with the gate and date lines,
   wherein the pixel electrode and the common electrode are coplanar on the passivation layer,
   wherein the outer common line is coplanar with the pixel electrode and the common electrode,
   wherein the outer common line is overlapped with the gate line, having the gate insulating layer and the passivation layer therebetween,
   wherein the outer common line is overlapped with the data line, having the passivation layer therebetween,
   wherein the gate line, the data line, and the outer common line are formed by a resist printing process to have a straight rectangular shape, and
   wherein the common electrode and the pixel electrode are formed by the resist printing process to have straight-line shapes and to be perpendicular to the outer common line and the gate line.

2. The liquid crystal display according to claim 1, wherein the common electrode and the pixel electrode are formed in alternating positions.

3. A method of manufacturing a liquid crystal display, the method comprising the steps of:
   forming a straight-line shaped gate line connected to a gate electrode on a substrate;
   forming a straight-line shaped data line, wherein the data line intersects with the gate line to define a pixel;
   forming a gate insulating layer on the substrate and the gate electrode;
   forming a semiconductor layer on the gate insulating layer;
   forming a source electrode and a drain electrode on the semiconductor layer;
   forming a passivation layer on the substrate, source electrode, and the drain electrode;
   forming a contact hole through the passivation layer to expose the drain electrode;
   forming a pixel electrode to connect to the drain electrode through the contact hole;
   forming an outer common line surrounding the pixel and formed on the passivation layer; and
   forming a common electrode to connect to the outer common line,
   wherein the pixel electrode and the common electrode are coplanar on the passivation layer,
   wherein the outer common line is coplanar with pixel electrode and the common electrode,
   wherein the outer common line is overlapped with the gate line, having the gate insulating layer and the passivation layer therebetween,
   wherein the outer common line is overlapped with the data line, having the passivation layer therebetween,
   wherein the gate line, the data line, and the outer common line are formed by a resist printing process to have a straight rectangular shape, and
   wherein the common electrode and the pixel electrode are formed by the resist printing process to have straight-line shapes and to be perpendicular to the outer common line and the gate line.

4. The method according to claim 3, wherein the common electrode and the pixel electrode are formed in alternating positions.

5. The method according to claim 3, wherein the source electrode and the drain electrode are formed using a resist printing process.

* * * * *